(12) United States Patent
Torzewski et al.

(10) Patent No.: US 7,737,985 B2
(45) Date of Patent: Jun. 15, 2010

(54) PIXEL CACHE FOR 3D GRAPHICS CIRCUITRY

(75) Inventors: William Torzewski, San Diego, CA (US); Chun Yu, San Diego, CA (US); Alexei V. Bourd, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 11/621,052

(22) Filed: Jan. 8, 2007

(65) Prior Publication Data

US 2008/0111825 A1    May 15, 2008

Related U.S. Application Data

(60) Provisional application No. 60/865,011, filed on Nov. 9, 2006.

(51) Int. Cl.
G09G 5/36 (2006.01)
G06T 15/30 (2006.01)
G06T 17/20 (2006.01)

(52) U.S. Cl. ........................ 345/557; 345/423
(58) Field of Classification Search ............... None
See application file for complete search history.

(56) References Cited

U.S. PATENT DOCUMENTS

| 5,046,023 | A | * | 9/1991 | Katsura et al. | 345/619 |
| 5,131,080 | A | * | 7/1992 | Fredrickson et al. | 345/557 |
| 6,587,113 | B1 | * | 7/2003 | Baldwin et al. | 345/557 |
| 6,650,333 | B1 | * | 11/2003 | Baldwin | 345/552 |
| 2002/0171657 | A1 | * | 11/2002 | Lavelle et al. | 345/557 |
| 2004/0201590 | A1 | * | 10/2004 | Wu et al. | 345/519 |
| 2004/0227765 | A1 | * | 11/2004 | Emberling | 345/582 |
| 2005/0012679 | A1 | * | 1/2005 | Karlov | 345/1.1 |

* cited by examiner

*Primary Examiner*—Kee M Tung
*Assistant Examiner*—Robert Craddock
(74) *Attorney, Agent, or Firm*—Timothy F. Loomis; James R. Gambale, Jr.

(57) ABSTRACT

Apparatus are provided including device memory, hardware entities, a sub-image cell value cache, and a cache write operator. At least some of the hardware entities perform actions involving access to and use of the device memory. The hardware entities include 3D graphics circuitry to process, for ready display, 3D images from primitive objects. The cache is separate from the device memory, and is provided to hold data, including buffered sub-image cell values. The cache is connected to the 3D graphics circuitry so that pixel processing portions of the 3D graphics circuitry access the buffered sub-image cell values in the cache, in lieu of the pixel processing portions directly accessing the sub-image cell values in the device memory. The write operator writes the buffered sub-image cell values to the device memory under direction of a priority scheme. The priority scheme preserves in the cache border cell values bordering one or more primitive objects.

59 Claims, 3 Drawing Sheets

… (US 7,737,985 B2)

PIXEL CACHE FOR 3D GRAPHICS CIRCUITRY

RELATED APPLICATIONS

The present application for patent claims priority to Provisional Application No. 60/865,011 entitled "PIXEL CACHE FOR 3D GRAPHICS CIRCUITRY," filed on Nov. 9, 2006, assigned to the assignee hereof, and hereby expressly incorporated by reference herein in its entirety.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

BACKGROUND OF THE DISCLOSURE

The present disclosure is related to embedded systems having 3D graphics capabilities. In other respects, the present disclosure is related to a graphics pipeline, a mobile phone, and/or memory structures for the same.

Embedded systems, for example, have limited memory resources. A given embedded system may have a main memory and a system bus, both of which are shared by different system hardware entities, including a 3D graphics chip.

Meanwhile, the embedded system 3D graphics chip may require a large portion of bandwidth of the main memory via the system bus. Memory bandwidth demands can result in a memory access bottleneck, which could adversely affect the operation of the 3D graphics chip as well as of other hardware entities that use the same main memory and system bus.

BRIEF SUMMARY OF THE DISCLOSURE

Apparatus are provided, which comprise a device memory, hardware entities connected to the device memory, a sub-image cell value cache, and a cache write operator. At least some of the hardware entities are provided to perform actions involving access to and use of the device memory. The hardware entities include 3D graphics circuitry. The cache is separate from the device memory, and is provided to hold data, including buffered sub-image cell values. The cache is connected to the 3D graphics circuitry so that pixel processing portions of the 3D graphics entity access the buffered sub-image cell values in the cache in lieu of the pixel processing portions directly accessing the sub-image cell values in the device memory. The cache write operator writes the buffered sub-image cell values to the device memory in accordance with a priority scheme. The priority scheme preserves in the cache border cell values.

BRIEF DESCRIPTION OF THE DRAWINGS

Embodiments of the present disclosure are further described in the detailed description, which follows, by reference to the noted drawings, in which like reference numerals represent similar parts throughout the several views of the drawings, and wherein.

DETAILED DESCRIPTION

To facilitate an understanding of the following detailed description, definitions will be provided for certain terms used herein. A primitive, may be, for example, a point, a line, or a triangle. A triangle may be rendered in groups of fans, strips, or meshes. An object may be one or more primitives. A pixel includes information regarding a location on a screen along with color information and optionally additional information (e.g., depth). The color information may, for example, be in the form of an RGB color triplet. A screen grid cell is the area of the screen that may be occupied by a given pixel. A sub-image cell is a cell which corresponds to a portion of an image, which may correspond to a location on a rendered screen. A grid cell is a cell arranged in a form of a grid. A screen grid value is a value corresponding to a screen grid cell.

Figure 1:
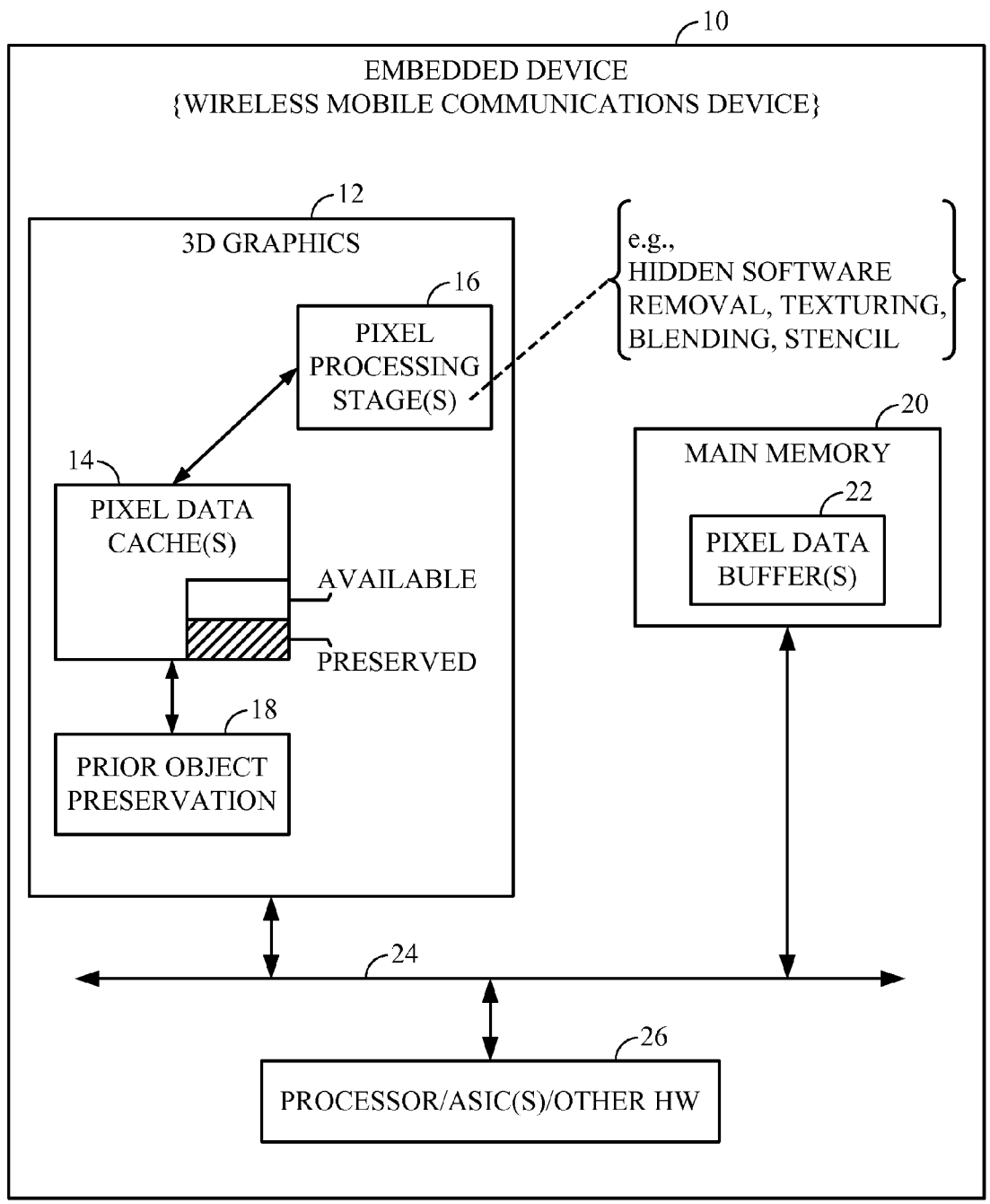
FIG. 1 is a block diagram of an embodiment of an embedded device having a pixel cache.

FIG. 1 is a block diagram of an example of an embedded device 10, which in the illustrated embodiment comprises a wireless mobile communications device. The illustrated embedded device 10 includes a system bus 24, a device memory (a main memory 20 in the illustrated system), and 3D graphics circuitry 12. The device memory is connected to and accessible by other portions of the embedded device 10 through system bus 24. Hardware entities 26 are provided, which are also connected to system bus 24. At least some of the hardware entities 26 perform actions involving access to and use of main memory 20. The hardware entities 26 may comprise, for example, a processor, one or more ASICs (application specific integrated circuits), and/or other hardware. 3D graphics circuitry 12 is connected to system bus 24. 3D graphics circuitry 12 may be a core of a larger integrated system (e.g., a system on a chip (SoC)), or it may include a 3D graphics chip, such as a 3D graphics accelerator chip. The 3D graphics circuitry 12 includes a graphics pipeline, which may include, for example, a pixel data cache 14, one or more pixel processing stages 16, and a prior object preservation mechanism 18.

Pixel data cache 14 may be in the form of one or a plurality of memories, buffers, or caches, and it holds data used in per-pixel processing by pixel processing stages 16 of 3D graphics circuitry 12. The illustrated cache 14 provides local storage of pixel-related data, such as pixel information from one or more pixel data buffers 22 provided within main memory 20. The one or more pixel data buffers 22 may comprise, e.g., one or more color buffers, Z buffers, and/or stencil buffers. Those buffers may store separately addressable pixels for a given 3D graphics image. Each pixel may, for example, be indexed with X (horizontal position) and Y (vertical position) screen position index integer values. Pixel data buffers 22, in the illustrated system, include, for each pixel, RGB and alpha values. In the illustrated embodiment, a Z buffer is also provided which includes depth values (Z) for each pixel.

One or more pixel data caches 14 may be provided, which may correspond to respective pixel processing stages 16. Each pixel data cache 14 includes an available portion of the cache into which new pixel data can be read from main memory 20, and a preserved portion which is not available for reading pixel data from main memory 20 into the cache. Prior object preservation mechanism 18 is provided to cause the preservation of pixel data from a prior object which has already been processed by a given one of pixel processing stages 16.

3D graphics circuitry 12 may include a number of pixel processing stages 16, for example, a blending stage (not shown), a texturing stage (not shown), a hidden surface removal (HSR) stage (not shown), and a stencil stage (not shown).

Figure 2:
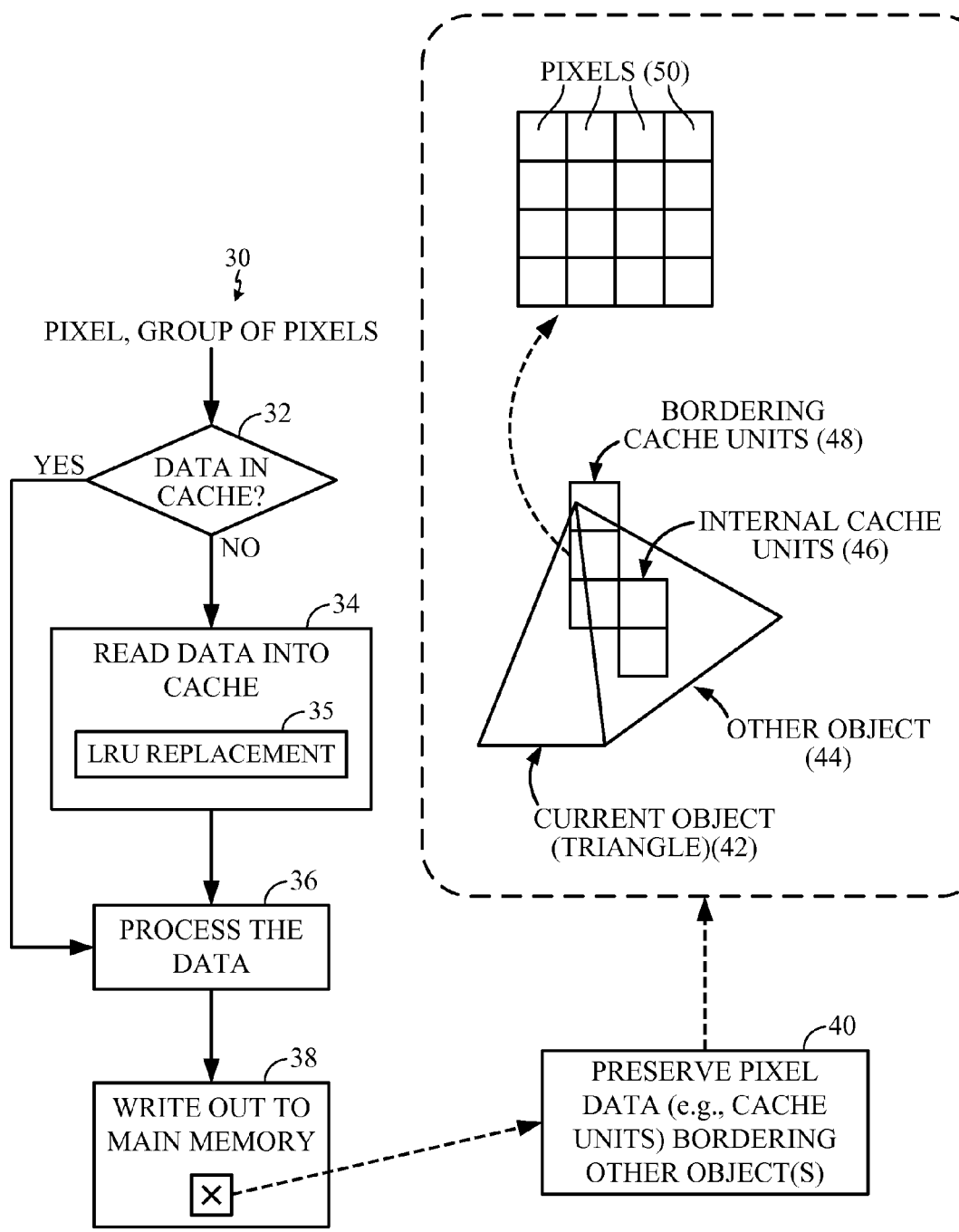
FIG. 2 is a flow chart of a pixel cache process in accordance with one embodiment.

The illustrated pixel data cache 14 may perform a process as shown by the flow chart in FIG. 2. For each pixel or for a group of pixels 30, a number of acts are performed by the pixel cache. Those acts include, as shown in FIG. 2, in act 32, determining whether the data being requested by a given pixel processing stage is in the cache. When the data is in the cache, the process proceeds to act 36, at which point the data is processed. When the data is not in the cache, the process proceeds from act 32 to act 34, at which point the data is read from pixel data buffer(s) 22 in main memory 20, over system bus 24, into pixel cache 14. Once the data is processed at act 36, the data can be written to the main memory at act 38. The processed data may be written out to the main memory 20 immediately, or later at an appropriate moment. In the illustrated embodiment, some pixel data, that will not likely be needed when a next object is processed, will be written to the main memory sooner than other data, i.e., border pixel data bordering the current object being processed and one or more other objects. This preservation of border pixel data is indicated by act 40 shown in FIG. 2.

In order to know when pixel data borders one or more objects, for example, the pixel data may be categorized (e.g., at the rasterization stage) into two groups, including border pixel values that border at least one object (e.g., bordering cache units 48), and non-border pixel values (e.g., internal cache units 46).

By preserving border pixel values, e.g., bordering one or more objects per the illustrated embodiment, when pixel data for another object (e.g., other object 44) is processed, the border pixel values will have already been within the cache, having been read into the cache while the current (now former) object 42 was being processed.

In the illustrated embodiment, the objects include triangles.

The pixel values may be grouped into cache units, each of which includes one or more pixels. In the illustrated embodiment, a cache unit is a set of pixels, for example, an array of pixels 50, as shown in FIG. 2. A cache unit may, for example, be a block, a tile, or a line of multiple pixel values.

While the specific embodiment involves the processing of pixel values, variations to the disclosed features may include, for example, processing of sub-image cell values corresponding to sub-image cells.

The bordering cache units 48 and internal cache units 46 may be characterized at the stage of rasterization, i.e., the point at which the primitives or objects (in this case triangles) are converted to pixel data. This may be done, for example, by adding one or a few bits to the data for each pixel, to indicate whether or not the pixel data corresponds to a border cache unit or an internal cache unit. In addition, it is noted that internal cache units may be more amenable to compression. The pixel data for each pixel may further include a bit for indicating whether or not the pixel data has been compressed. The pixel data may include, for example, color and alpha information, or simply depth (Z) values, or a combination of such information. The data being processed by the process shown in FIG. 2 could be that of a whole object, or a portion of an object.

The illustrated 3D graphics circuitry 12 is provided to process, for display, 3D images in pieces defined in terms of primitive objects (triangles in the illustrated embodiment). The illustrated cache 14 includes buffered sub-image cell values (pixel values in this embodiment), and is connected to the 3D graphics circuitry 12 so that pixel processing portions (stages 16 in the illustrated embodiment) of the 3D graphics circuitry 12 access the buffered cell values in the cache, in lieu of those pixel processing portions directly accessing those values in the device memory (main memory 20). A cache write operator (see, e.g., act 38) is provided to write the buffered sub-image cell values to the device memory. In the example embodiment, the buffered values are written to the device memory in units, each unit including an integer multiple of the buffered sub-image cell values. Such a unit may be referred to as a cache unit.

The cache may further include a cache miss read operator (see, e.g., act 34) to read data out of the device memory to the cache. To facilitate this reading operation, certain memory locations in the cache are designated as being free to be overwritten, for example, with the use of a bit to indicate whether the pixel data is dirty or valid. When the data is dirty, it does not coincide with the corresponding pixel data in the device memory, and needs to be written to the device memory before it can be overwritten. When pixel data is clean or invalid, the pixel data corresponds to the data in the device memory, and therefore, can be overwritten in a read operation.

Writing to the device memory occurs in accordance with a priority scheme. The priority scheme preserves in the cache cell (at least) those values bordering more than one primitive object. Those cell values that border more than one primitive object may, e.g., be within a range of the border between plural primitive objects and/or be within units intersecting a border, each unit including an integer multiple of the buffered sub-image cell values.

A least recently used (LRU) replacement 35 may be provided as part of act 34 to cause reading, in accordance with an LRU replacement policy, of cell values from the device memory as new data is required upon cache miss reads. With this said, in one embodiment, preserved border cell data will not be replaced until all non-border data has been replaced within the cache. In addition, in the illustrated embodiment, there is a write back of dirty data for non-border cell values before there is a write back of dirty data for border cell values. For example, there may be a write back of dirty data for non-border cell values without waiting for a read upon a cache miss, while there is a write back of dirty data for border cell values upon the unavailability of space in the cache for requested cache miss border cell values.

Figure 3:
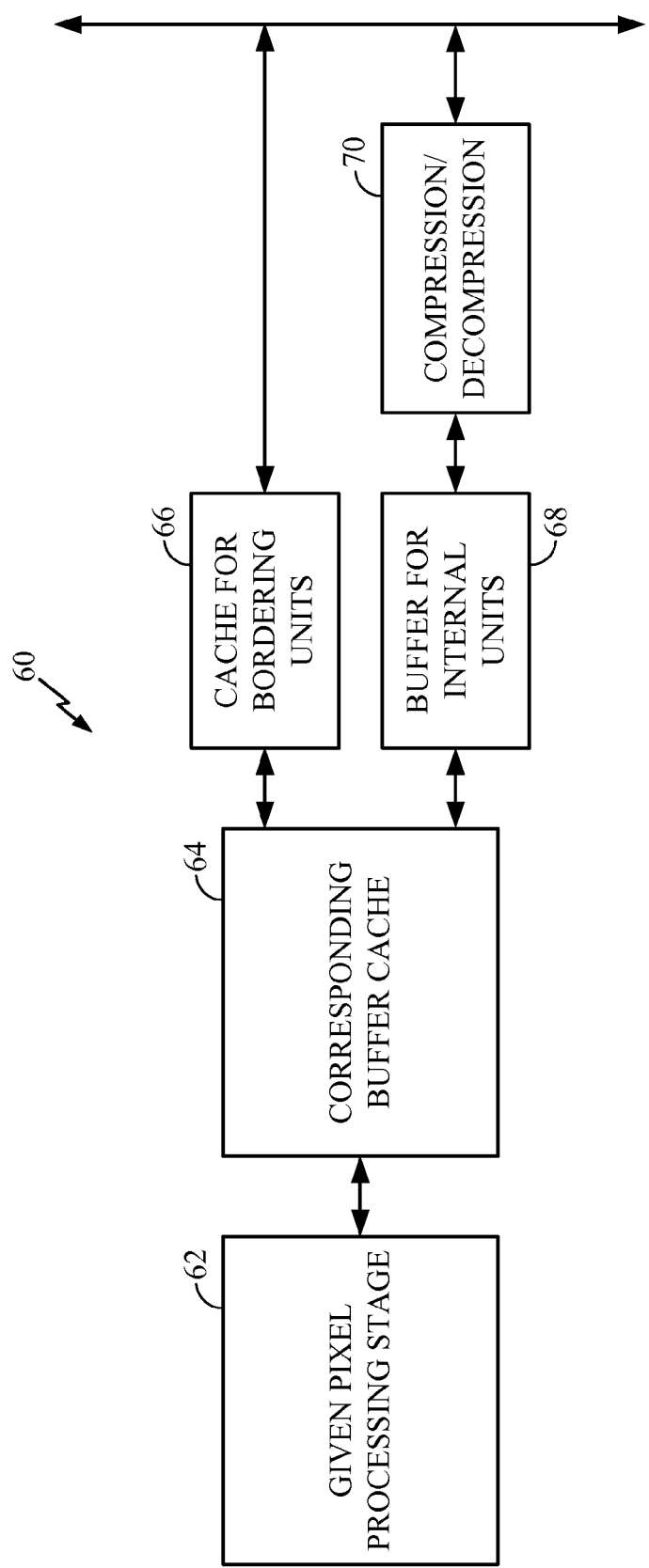
FIG. 3 is a block diagram of an example of caching architecture for a pixel processing stage.

FIG. 3 illustrates an example of a caching architecture 60 for a given pixel processing stage. The illustrated architecture 60 includes a given pixel processing stage 62, which may, for example, be a hidden surface removal stage, a blending stage, and/or a stencil operating stage. The illustrated given pixel processing stage 62 is connected to a corresponding buffer cache 64. Accordingly, the illustrated embodiment may include a respective corresponding buffer cache for each pixel processing stage that operates on or processes pixel data. The corresponding buffer cache 64 is connected to a cache 66 for border units and a buffer 68 for internal units. A compression/decompression unit 70 is provided between buffer 68 and the system bus, which is connected to the device memory (not shown in FIG. 3). As shown in FIG. 3, border units are retrieved by cache 66, while internal units are retrieved by buffer 68, from the device memory. Before storing internal units in buffer 68, those units, when they contain compressed pixel data, are decompressed by compression/decompression unit 70. Before such data is written back to the device memory, it is again compressed, as appropriate, by compression/decompression unit 70. In the illustrated embodiment, cache 66 is a proper cache, while buffer 68 is a double (or multi)-buffer. The size of cache 66 is on the order of multiple cache units, while the size of buffer 68 is substantially smaller, for example, a few cache units in the illustrated embodiment.

In the illustrated embodiment, cache 66 may be, e.g., a set associative cache, which provides superior operation to that of a direct map cache for purposes of storing bordering cache units.

Corresponding buffer cache 64 is an associated cache which receives data from each of cache 66 and buffer 68, using a write-through approach for writing to either the cache 66 or buffer 68, which may then perform a write operation to the device memory as described above in relation to FIG. 2.

The processing performed by each of the elements shown in the figures herein may be performed by a general purpose computer, and/or by a specialized processing computer. Such processing may be performed by a single platform, by a distributed processing platform, or by separate platforms. In addition, such processing can be implemented in the form of special purpose hardware, or in the form of software being run by a general purpose computer. Any data handled in such processing or created as a result of such processing can be stored in any type of memory. By way of example, such data may be stored in a temporary memory, such as in the RAM of a given computer system or subsystems. In addition, or in the alternative, such data may be stored in longer-term storage devices, for example, magnetic discs, rewritable optical discs, and so on. For purposes of the disclosure herein, machine-readable media may comprise any form of data storage mechanism, including such memory technologies as well as hardware or circuit representations of such structures and of such data. The processes may be implemented in any machine-readable media and/or in an integrated circuit.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example may arise from applicants/patentees, and others.

What is claimed is:

1. Apparatus comprising:
   device memory and hardware entities connected to the device memory, at least some of the hardware entities to perform actions involving access to and use of the device memory, and the hardware entities including 3D graphics circuitry to process, for ready display, 3D images from primitive objects;
   a sub-image cell value cache separate from the device memory to hold data, including buffered sub-image cell values, the cache being connected to the 3D graphics circuitry so that pixel processing portions of the 3D graphics circuitry access the buffered sub-image cell values in the cache, in lieu of the pixel processing portions directly accessing the sub-image cell values in the device memory; and
   a cache write operator to write the buffered sub-image cell values to the device memory in accordance with a priority scheme, the priority scheme preserving in the cache border sub-image cell values bordering at least one primitive object.

2. The apparatus according to claim 1, wherein the primitive objects include triangles.

3. The apparatus according to claim 2, wherein the 3D graphics circuitry includes a 3D graphics chip including a 3D graphics pipeline.

4. The apparatus according to claim 3, wherein the sub-image cell values include color values of pixels.

5. The apparatus according to claim 3, wherein the sub-image cell values include depth (Z) values.

6. The apparatus according to claim 1, wherein the sub-image cell values include color values of pixels.

7. The apparatus according to claim 1, wherein the sub-image cell values include depth (Z) values.

8. The apparatus according to claim 1, wherein the sub-image cell includes a grid cell.

9. The apparatus according to claim 1, wherein the buffered sub-image cell values are written to the device memory by the write operator in units, each unit including an integer multiple of the buffered sub-image cell values.

10. The apparatus according to claim 1, further including a designation mechanism to designate memory locations of the cache as free to be overwritten upon a read of data from the device memory to the sub-image cell value cache.

11. The apparatus according to claim 1, further comprising a cache miss read operator, including a least-recently used (LRU) replacement portion, to read, in accordance with an LRU replacement policy, cell values from the device memory as new data is required upon cache miss reads by a given pixel processing portion.

12. The apparatus according to claim 11, wherein the replacement policy causes replacement of data for non-border sub-image cell values before replacement of data for border sub-image cell values.

13. The apparatus according to claim 12, wherein the cache write operator includes a write mechanism to write to the device memory dirty data for non-border sub-image cell values without waiting for a read from the device memory upon a cache miss, and to write to the device memory dirty data for border sub-image cell values upon unavailability of space in the cache for requested cache miss border sub-image cell values.

14. The apparatus according to claim 1, wherein the border sub-image cell values bordering more than one primitive object include cell values within a range of a border between plural primitive objects.

15. The apparatus according to claim 1, wherein the border sub-image cell values bordering more than one primitive object include cell values within units intersecting a border, each unit including an integer multiple of the buffered sub-image cell values.

16. The apparatus according claim 1, wherein the apparatus includes an embedded device.

17. An integrated circuit comprising:
   a semiconductor substrate;
   on the substrate, device memory and hardware entities connected to the device memory, at least some of the hardware entities to perform actions involving access to and use of the device memory, and the hardware entities including 3D graphics circuitry to process, for display, 3D images from primitive objects;
   on the semiconductor substrate, a sub-image cell value cache separate from the device memory to hold data, including buffered sub-image cell values, the cache being connected to the 3D graphics circuitry so that pixel processing portions of the 3D graphics circuitry access the buffered sub-image cell values in the cache, in lieu of the pixel processing portions directly accessing the sub-image cell values in the device memory; and
   on the semiconductor substrate, a cache write operator to write the buffered sub-image cell values to the device memory in accordance with a priority scheme, the priority scheme preserving in the cache border sub-image cell values bordering at least one primitive object.

18. The integrated circuit according to claim 17, wherein the primitive objects include triangles.

19. The integrated circuit according to claim 18, wherein the 3D graphics circuitry includes a 3D graphics chip including a 3D graphics pipeline.

20. The integrated circuit according to claim 17, wherein the sub-image cell values include pixels.

21. The integrated circuit according to claim 17, wherein the sub-image cell values include depth (Z) values.

22. The integrated circuit according to claim 17, wherein the sub-image includes a grid.

23. The integrated circuit according to claim 18, wherein the buffered sub-image cell values are written to the device memory by the write operator in units, each unit including an integer multiple of the buffered sub-image cell values.

24. The integrated circuit according to claim 17, further including a designation mechanism to designate memory locations of the cache as free to be overwritten upon a read of data from the device memory to the cache.

25. The integrated circuit according to claim 17, further comprising a cache miss read operator, including a least-recently used (LRU) replacement portion, to read, in accordance with an LRU replacement policy, cell values from the device memory as new data is required upon cache miss reads by a given pixel processing portion.

26. The integrated circuit according to claim 25, wherein the replacement policy causes replacement of data for non-border sub-image cell values before replacement of data for border sub-image cell values.

27. The integrated circuit according to claim 26, wherein the cache write operator includes a write mechanism to write back to the device memory dirty data for non-border sub-image cell values without waiting for a read from the device memory upon a cache miss, and to write to the device memory dirty data for border sub-image cell values upon unavailability of space in the cache for requested cache miss border sub-image cell values.

28. A method comprising:
pixel processing portions of 3D graphics circuitry accessing buffered sub-image cell values in a cache separate from device memory, in lieu of the pixel processing portions directly accessing the sub-image cell values in the device memory; and
writing the buffered sub-image cell values to the device memory in accordance with a priority scheme, the priority scheme preserving in the cache border sub-image cell values bordering at least one primitive object.

29. The method according to claim 28, wherein the primitive objects includes triangles.

30. The method according to claim 29, wherein the 3D graphics circuitry includes a 3D graphics chip including a 3D graphics pipeline.

31. The integrated circuit according to claim 28, wherein the sub-image cell values include pixels.

32. The method according to claim 28, wherein the sub-image cell values include depth (Z) values.

33. The method according to claim 28, wherein the sub-image includes a grid.

34. The method according to claim 29, wherein the buffered sub-image cell values are written to the device memory in units, each unit including an integer multiple of the buffered sub-image cell values.

35. The method according to claim 28, further comprising designating memory locations of the cache as free to be overwritten upon a read of data from the device memory to the cache.

36. The method according to claim 28, further comprising reading in accordance with an LRU replacement policy, cell values from the device memory as new data is required upon cache miss reads by a given pixel processing portion.

37. The method according to claim 36, wherein the replacement policy causes replacement of data for non-border sub-image cell values before replacement of data for border sub-image cell values.

38. The method according to claim 37, wherein dirty data for non-border sub-image cell values is written to the device memory without waiting for a read from the device memory upon a cache miss, and dirty data for border sub-image cell values is written to the device memory upon unavailability of space in the cache for requested cache miss border sub-image cell values.

39. Apparatus comprising:
means for accessing, for pixel processing in 3D graphics circuitry, buffered sub-image cell values in a cache separate from device memory, in lieu of directly accessing the sub-image cell values in the device memory; and
means for writing the buffered sub-image cell values to the device memory in accordance with a priority scheme, the priority scheme preserving in the cache border sub-image cell values bordering at least one primitive object.

40. The apparatus according to claim 39, wherein the primitive objects includes triangles.

41. The apparatus according to claim 40, wherein the 3D graphics circuitry includes a 3D graphics chip including a 3D graphics pipeline.

42. The apparatus according to claim 39, wherein the sub-image cell values include pixels.

43. The apparatus according to claim 39, wherein the sub-image cell values include depth (Z) values.

44. The apparatus according to claim 39, wherein the sub-image includes a grid.

45. The apparatus according to claim 40, wherein the buffered sub-image cell values are written to the device memory in units, each unit including an integer multiple of the buffered sub-image cell values.

46. The apparatus according to claim 39, further including means for designating memory locations of the cache as free to be overwritten upon a read of data from the device memory to the cache.

47. The apparatus according to claim 39, further comprising means for reading, in accordance with an LRU replacement policy, cell values from the device memory as new data is required upon cache miss reads.

48. The apparatus according to claim 47, wherein the replacement policy causes replacement of data for non-border sub-image cell values before replacement of data for border sub-image cell values.

49. The apparatus according to claim 48, wherein dirty data for non-border sub-image cell values is written to the device memory without waiting for a read from the device memory upon a cache miss, and dirty data for border sub-image cell values is written to device memory upon unavailability of space in the cache for requested cache miss border sub-image cell values.

50. Machine-readable media encoded with data, the data being interoperative with a machine to cause:
pixel processing portions of 3D graphics circuitry accessing buffered sub-image cell values in a cache separate from device memory, in lieu of the pixel processing portions directly accessing the sub-image cell values in the device memory; and writing the buffered sub-image cell values to the device memory in accordance with a priority scheme, the priority scheme preserving in the cache border sub-image cell values bordering at least one primitive object.

51. The machine-readable media according to claim 50, wherein the primitive objects includes triangles.

52. The machine-readable media according to claim 51, wherein the 3D graphics circuitry includes a 3D graphics chip including a 3D graphics pipeline.

53. The machine-readable media according to claim 50, wherein the sub-image cell values include pixels.

54. The machine-readable media according to claim 50, wherein the sub-image cell values include depth (Z) values.

55. The machine-readable media according to claim 50, wherein the sub-image includes a grid.

56. The machine-readable media according to claim 51, wherein the buffered sub-image cell values are written to the device memory in units, each unit including an integer multiple of the buffered sub-image cell values.

57. The machine-readable media according to claim 50, the data being interoperable with a machine to designate memory locations of the cache as free to be overwritten upon a read of data from the device memory to the cache.

58. The machine-readable media according to claim 50, the data being interoperable with a machine to read, in accordance with an LRU replacement policy, cell values from the device memory as new data is required upon cache miss reads by a given pixel processing portion.

59. The machine-readable media according to claim 58, wherein the replacement policy causes replacement of data for non-border sub-image cell values before replacement of data for border sub-image cell values.

* * * * *

UNITED STATES PATENT AND TRADEMARK OFFICE
CERTIFICATE OF CORRECTION

| | | |
|---|---|---|
| PATENT NO. | : 7,737,985 B2 | Page 1 of 1 |
| APPLICATION NO. | : 11/621052 | |
| DATED | : June 15, 2010 | |
| INVENTOR(S) | : Torzewski et al. | |

It is certified that error appears in the above-identified patent and that said Letters Patent is hereby corrected as shown below:

Column 7, line 53, claim 29: "objects includes" to read as --objects include--

Column 8, line 30, claim 40: "includes" to read as --include--

Column 9, line 9, claim 51: "objects includes" to read as --objects include--

Signed and Sealed this
Fifth Day of July, 2011

David J. Kappos
*Director of the United States Patent and Trademark Office*